United States Patent
Mizuno et al.

(10) Patent No.: US 7,144,460 B2
(45) Date of Patent: Dec. 5, 2006

(54) BALL/ROLLER BEARING CLEANING METHOD AND APPARATUS THEREOF

(75) Inventors: Hiroki Mizuno, Kanagawa (JP); Shigeo Tokura, Kanagawa (JP); Katsuhisa Tonooka, Kanagawa (JP); Hiroshi Shibazaki, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/748,163

(22) Filed: Dec. 31, 2003

(65) Prior Publication Data

US 2004/0168704 A1 Sep. 2, 2004

Related U.S. Application Data

(62) Division of application No. 09/708,653, filed on Nov. 9, 2000, now Pat. No. 6,694,991.

(30) Foreign Application Priority Data

Nov. 9, 1999 (JP) ............... P. 11-318443

(51) Int. Cl.
*B08B 3/00* (2006.01)
*B08B 3/12* (2006.01)

(52) U.S. Cl. .............. 134/1; 134/22.18; 134/23; 134/33; 134/34

(58) Field of Classification Search ............ 134/1, 134/22.18, 23, 33, 34, 116, 138, 141, 147, 134/149, 153, 157, 201
See application file for complete search history.

(56) References Cited

U.S. PATENT DOCUMENTS

| | | |
|---|---|---|
| 1,878,277 A | 9/1932 | Hodge |
| 1,894,786 A | 1/1933 | Pew |
| 2,369,498 A | 2/1945 | Steuber |
| 2,549,837 A | 4/1951 | Merritt |
| 2,828,231 A | 3/1958 | Henry |
| 3,027,590 A * | 4/1962 | Heim .................... 15/304 |
| 3,059,654 A | 10/1962 | Weiner |
| 3,070,103 A * | 12/1962 | Pickard et al. ........... 134/107 |
| 4,037,613 A | 7/1977 | Elliott |
| 4,727,619 A | 3/1988 | Robbins |
| 5,678,582 A | 10/1997 | McClure |

FOREIGN PATENT DOCUMENTS

JP 11-138111 A 5/1999

* cited by examiner

*Primary Examiner*—Joseph L. Perrin
(74) *Attorney, Agent, or Firm*—Sughrue Mion, PLLC

(57) ABSTRACT

The present ball/roller bearing cleaning method is a method which, using cleaning liquid 24, cleans a bearing to be cleaned 1 composed of an inner ring 1b, an outer ring 1a, a rolling bodies 1c and a retainer. In the cleaning method, the cleaning liquid 24 is made to flow through the bearing to be cleaned 1 from the axial direction of the present bearing 1 into spaces in which the raceway surfaces of the inner and outer rings 1b and 1a of the bearing to be cleaned 1 surround the rolling bodies 1c and retainer. For example, a cylindrical-shaped rotary die 2 having spiral grooves 2a is interposed into a cleaning liquid supply passage, and the cleaning liquid 4 is supplied to thereby rotate the cylindrical-shaped rotary die 2, whereby the cleaning liquid having high pressure can be supplied to the bearing to be cleaned 1 from the cylindrical-shaped rotary die 2.

5 Claims, 12 Drawing Sheets

BALL/ROLLER BEARING CLEANING METHOD AND APPARATUS THEREOF

This is a divisional of application Ser. No. 09/708,653 filed Nov. 9, 2000 now U.S. Pat. No. 6,694,991; the disclosure of which is incorporated herein by reference.

BACKGROUND OF THE INVENTION

1. Field of the Invention

The present invention relates to a method which, in a process of manufacturing where high cleanliness is required to a ball/roller bearing, cleans an assembled ball/roller bearing before supplying oil or grease.

2. Description of the Related Art

Conventionally, as a method for cleaning a mechanical part, an ultrasonic cleaning method has been mainly used. In this ultrasonic cleaning method, for example, as shown in FIG. 14, a bearing 1 to be cleaned stored in a washing basket 50 is cleaned within a cleaning vessel 22 which includes an ultrasonic vibration plate 20 mounted on the bottom portion thereof and is filled with cleaning liquid 24.

Also, as a method for cleaning a ball/roller bearing, a patent is disclosed, for example, in Japanese Patent Unexamined Publication No. Hei.11-138111 (JP-A-11-138111). In this cleaning method, a bearing to be cleaned is disposed on a rotary table where cleaning liquid is jetted onto the bearing from inside and outside as well as from above and below, thereby cleaning the bearing.

However, in the above-mentioned conventional ultrasonic cleaning method, due to the characteristics of ultrasonic waves, the ultrasonic waves are not able to effect the interior parts of the bearing to be cleaned, which results in insufficient cleaning. Especially, since the bearing to be cleaned is simply immersed in the cleaning liquid, it is difficult to completely remove dirt particles existing between the rolling bodies and retainer of the bearing to be cleaned.

Also, in the latter ultrasonic cleaning method, although the area of the bearing where the jetted cleaning liquid is applied can be cleaned, the cleaning liquid is splashed back from the portions of the bearing where it is applied, so that the portions of the bearing, where the jetted cleaning liquid cannot be applied directly, cannot be cleaned to a satisfactory degree. Therefore, it is difficult to completely remove dirt particles between the parts of the bearing to be cleaned, for example, between the rolling bodies and retainer of the bearing to be cleaned. Also, referring to an ultrasonic cleaning apparatus employed in enforcing the ultrasonic cleaning method, the structure thereof is complicated: that is, the ultrasonic cleaning apparatus is capable of cleaning a ball/roller bearing of a relatively large size but is not suitable to clean a ball/roller bearing of a small size.

SUMMARY OF THE INVENTION

The present invention aims at solving the drawbacks found in the above-mentioned conventional ball/roller bearing cleaning methods. Accordingly, an object of the invention is to provide a ball/roller bearing cleaning method and apparatus which enables highly effective cleaning even the portions of the bearing that are shaded from being cleaned with respect to the cleaning liquid, as well as cleaning the dirt particles caught between the parts of the bearing to be cleaned, that have been difficult to clean in the conventional ball/roller bearing cleaning methods.

In attaining the above object, according to a first aspect of the invention, a cleaning method is provided—for a bearing composed of an inner ring, an outer ring, rolling bodies and a retainer—using cleaning liquid, wherein the cleaning liquid is made to flow through the bearing to be cleaned from the axial direction of the bearing into spaces existing between the raceway surface of the inner ring and the raceway surface of the outer ring of the bearing to be cleaned and surrounding the rolling bodies and retainer.

According to the present ball/roller bearing cleaning method, the cleaning liquid is supplied from the axial direction of the bearing to be cleaned and into spaces which exist between the raceway surface of the inner ring and the raceway surface of the outer ring of the bearing to be cleaned and also surround the rolling bodies and retainer, whereby dirt particles caught in the part where the cleaning liquid cannot be applied directly, that is, dirt particles existing between the surfaces of the rolling bodies and retainer can be removed positively.

Also, according to a second aspect of the invention, in the ball/roller bearing cleaning method according to the first aspect of the invention, the cleaning liquid is supplied in a state where the inner or outer ring of the bearing to be cleaned is fixed and the other is rotatable, whereby, while driving or rotating the rotatable ring of the bearing to be cleaned, the cleaning liquid can be flowed through the bearing to be cleaned.

In this method, while the inner or outer ring of the bearing to be cleaned is fixed, the other ring is rotated, so that the rolling bodies and retainer are rotated. Especially, since the rolling bodies are capable of rotating about their own axes as well as around the axis of the bearing, dirt particles existing between the rolling bodies and retainer can be scraped out efficiently and, by supplying the cleaning liquid forcibly into between the inner ring raceway surface and outer ring raceway surface of the bearing to be cleaned, the thus scraped dirt particles can be discharged out of the bearing to be cleaned.

According to a third aspect of the invention, in the ball/roller bearing cleaning method according to the first aspect of the invention, preferably, the bearing to be cleaned may be immersed in a cleaning vessel filled with cleaning liquid and the cleaning liquid in the cleaning vessel may be vibrated by ultrasonic waves.

According to this cleaning method, by applying the ultrasonic vibrations to the cleaning liquid in the cleaning vessel, the ultrasonic waves can be radiated onto the rolling bodies and retainer included in the interior portion of the bearing to be cleaned, which can enhance the cleaning effect further.

And, according to a fourth aspect of the invention, in the ball/roller bearing cleaning method according to the first aspect of the invention, while one of the outer ring and inner ring of the bearing to be cleaned is fixed in the surface layer portion of the cleaning vessel filled with the cleaning liquid and the other ring is free to rotate, the cleaning liquid may be jetted onto the rolling bodies of the bearing to be cleaned from obliquely above the bearing to be cleaned in the circumferential direction thereof.

According to this method, in case where it is impossible to supply the cleaning liquid into the interior portion of the bearing to be cleaned, by jetting the cleaning liquid with high pressure while aiming at the rolling bodies of the bearing to be cleaned, the bearing to be cleaned can be cleaned while it is being rotated by the cleaning liquid.

And, according to a fifth aspect of the invention, in the ball/roller bearing cleaning method according to the first aspect of the invention, while one of the outer ring and inner ring of the bearing to be cleaned is fixed in the surface layer portion of the cleaning vessel filled with the cleaning liquid, the other ring may be driven or rotated.

According to this method, by rotating one of the outer ring and inner ring of the bearing to be cleaned using a motor or an air turbine, the bearing to be cleaned can be cleaned while rotating the same, which can enhance the cleaning effect.

And, according to a sixth aspect of the invention, in the ball/roller bearing cleaning method according to the first aspect of the invention, there may be employed a two-stage cleaning method: that is, after execution of a non-rotation cleaning step in which the bearing to be cleaned is cleaned by making the cleaning solution flow through the interior portion of the bearing to be cleaned without rotating the same (or in combination with ultrasonic cleaning), there may be executed a rotation cleaning step in which the bearing to be cleaned is cleaned while rotating the same.

This two-stage cleaning method is effective in the following case: that is, a large number of hard foreign substances are present in the interior portion of the bearing to be cleaned and thus, in case where the bearing to be cleaned is rotated in this state, there is a fear that the raceway surfaces of the inner ring and outer ring as well as the surfaces of the rolling bodies of the bearing to be cleaned can be damaged. Specifically, in the non-rotation cleaning step, the cleaning liquid is flowed through the bearing to be cleaned without rotating the same and, by radiating the ultrasonic waves onto the bearing to be cleaned from below, hard dirt particles existing in the interior portion of the bearing to be cleaned can be removed; and, after that, while rotating the bearing to be cleaned, it is cleaned. This can prevent the surfaces of the rolling bodies as well as the raceway surfaces of the inner ring and outer ring of the bearing to be cleaned from being damaged by the hard dirt particles.

Also, according to a seventh aspect of the invention, the ball/roller bearing cleaning method according to the first aspect of the invention can be accomplished by using a ball/roller cleaning apparatus for cleaning a bearing to be cleaned composed of an inner ring, an outer ring, rolling bodies and a retainer, the ball/roller cleaning apparatus comprising: raceway fixing unit for fixing the outer ring or inner ring of the bearing to be cleaned; a cleaning liquid supply passage for supplying the cleaning liquid to one side surface of the bearing to be cleaned; and, a cylindrical-shaped rotary die which has a diameter substantially equal to the diameter of the cleaning liquid supply passage and is rotatably supported within the cleaning liquid supply passage and also in the outer peripheral surface having spiral grooves.

According to this ball/roller bearing cleaning apparatus, when the cleaning liquid is supplied toward one surface of the bearing to be cleaned, the cleaning liquid is allowed to flow along the spiral grooves of the cylindrical-shaped rotary die to thereby rotate the cylindrical-shaped rotary die within the cleaning liquid supply passage and, due to a pumping action produced at that time by the spiral grooves, the pressure of the cleaning liquid is increased; and thus, the cleaning liquid having higher pressure than its initial pressure when it is supplied is jetted onto one surface of the bearing to be cleaned from the cylindrical-shaped rotary die. as a result of this, the cleaning liquid is forcibly made to flow from the axial direction of the bearing to be cleaned into spaces which are present between the inner ring raceway surface and outer ring raceway surface of the bearing to be cleaned and surround the rolling bodies and retainer, so that dirt particles existing between the rolling bodies and retainer can be scraped out therefrom and also can be then discharged out of the bearing to be cleaned.

Also, according to an eighth aspect of the invention, in the ball/roller bearing cleaning apparatus according to the seventh aspect of the invention, instead of the cylindrical-shaped rotary die, there can also be used a conical-shaped rotary die in which its diameter on the upstream side, where the cleaning liquid flows, is reduced, and the cleaning liquid supply passage can also be narrowed along the outside diameter of the conical-shaped rotary die.

According to this structure, in a case where the pressure of the cleaning liquid is increased and thus the force of the cleaning liquid to push the bearing to be cleaned in the axial direction thereof is strengthened, interference with the rotation of the outer and inner rings can be controlled, which makes it possible to carry out a smooth cleaning operation.

And, according to a ninth aspect of the invention, the ball/roller bearing cleaning apparatus according to the seventh aspect of the invention, preferably, may comprise a cleaning vessel filled with the cleaning liquid and an ultrasonically vibrating unit for applying ultrasonic vibrations to the cleaning liquid within the cleaning vessel.

According to this structure, since the ultrasonic waves can be radiated onto the inner ring, rolling bodies and retainer of the bearing to be cleaned, the whole interior portion of the bearing to be cleaned can be cleaned, thereby enhancing the cleaning effect.

Also, according to a tenth aspect of the invention, the ball/roller bearing cleaning apparatus according to the seventh aspect of the invention may also comprise a cleaning liquid jetting unit for jetting the cleaning liquid from obliquely above the bearing to be cleaned in the circumferential direction toward one side surface of the bearing to be cleaned, while the inner ring or outer ring of the bearing to be cleaned is rotatably supported on the surface layer portion of the cleaning vessel.

According to this structure, in a case where the cleaning liquid cannot be forcibly supplied into the interior portion of the bearing to be cleaned, by jetting the cleaning liquid from obliquely above the bearing to be cleaned from the cleaning liquid jetting unit onto the rolling bodies of the bearing to be cleaned, the bearing to be cleaned can be cleaned while rotating the same, which can enhance the cleaning effect.

And, according to an eleventh aspect of the invention, the ball/roller bearing cleaning apparatus according to the tenth aspect of the invention may also comprise, instead of the cleaning liquid jetting unit, raceway rotating unit for driving or rotating the inner ring or outer ring of the bearing to be cleaned which is free to rotate.

According to this structure, in a case where the cleaning liquid cannot be forcibly supplied into the interior portion of the bearing to be cleaned, by rotating the freely rotatable inner ring or outer ring of the bearing to be cleaned using a motor or an air turbine, the bearing to be cleaned can be cleaned while rotating the same, which can enhance the cleaning effect.

DETAILED DESCRIPTION OF THE PREFERRED EMBODIMENT OF THE INVENTION

Now, description will be given below in detail of the preferred embodiments of a ball/roller bearing cleaning method and apparatus thereof according to the invention with reference to the accompanying drawings.

(First Embodiment)

Figure 1:
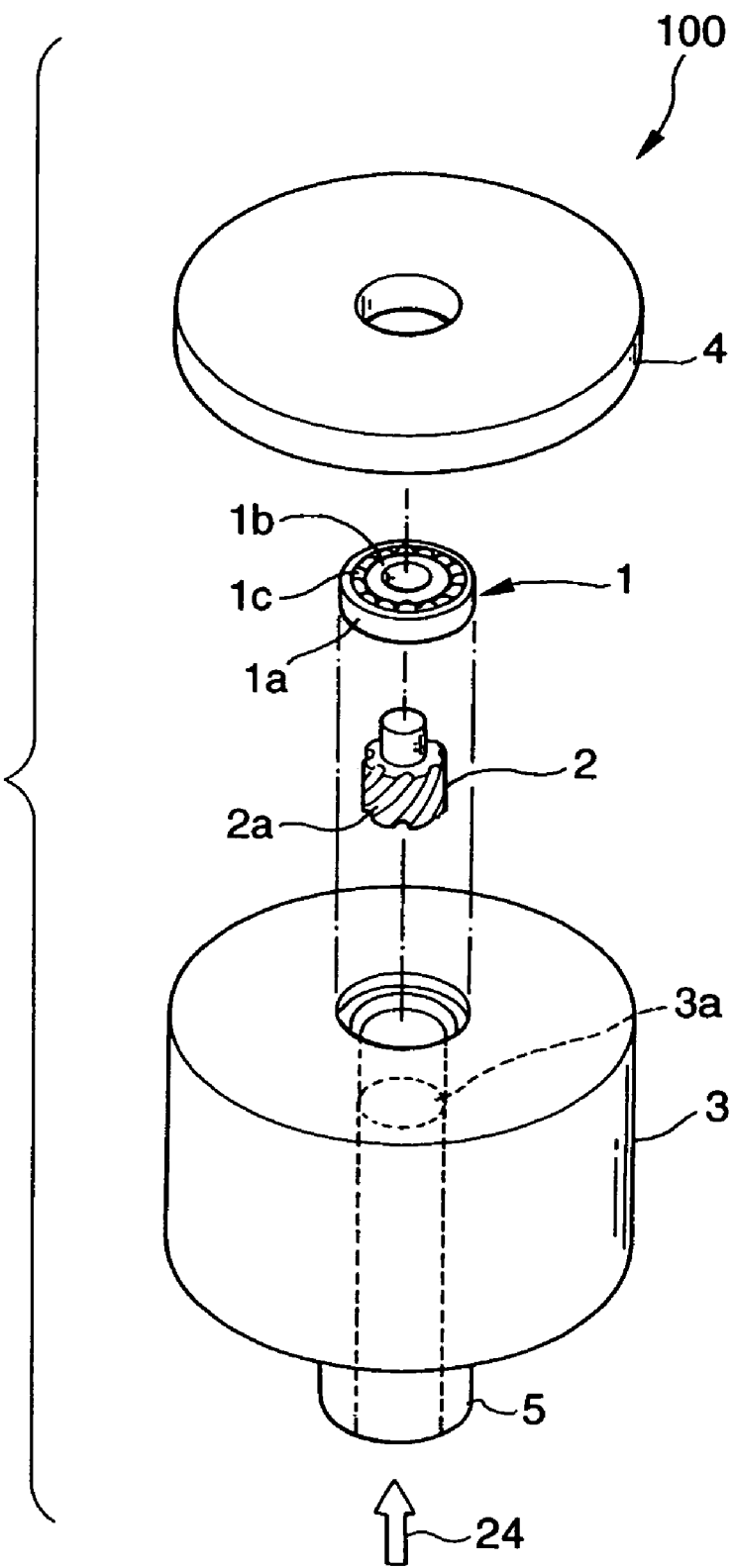
FIG. 1 is an exploded perspective view of a first embodiment of a ball/roller bearing cleaning apparatus according to the invention.
Figure 2:
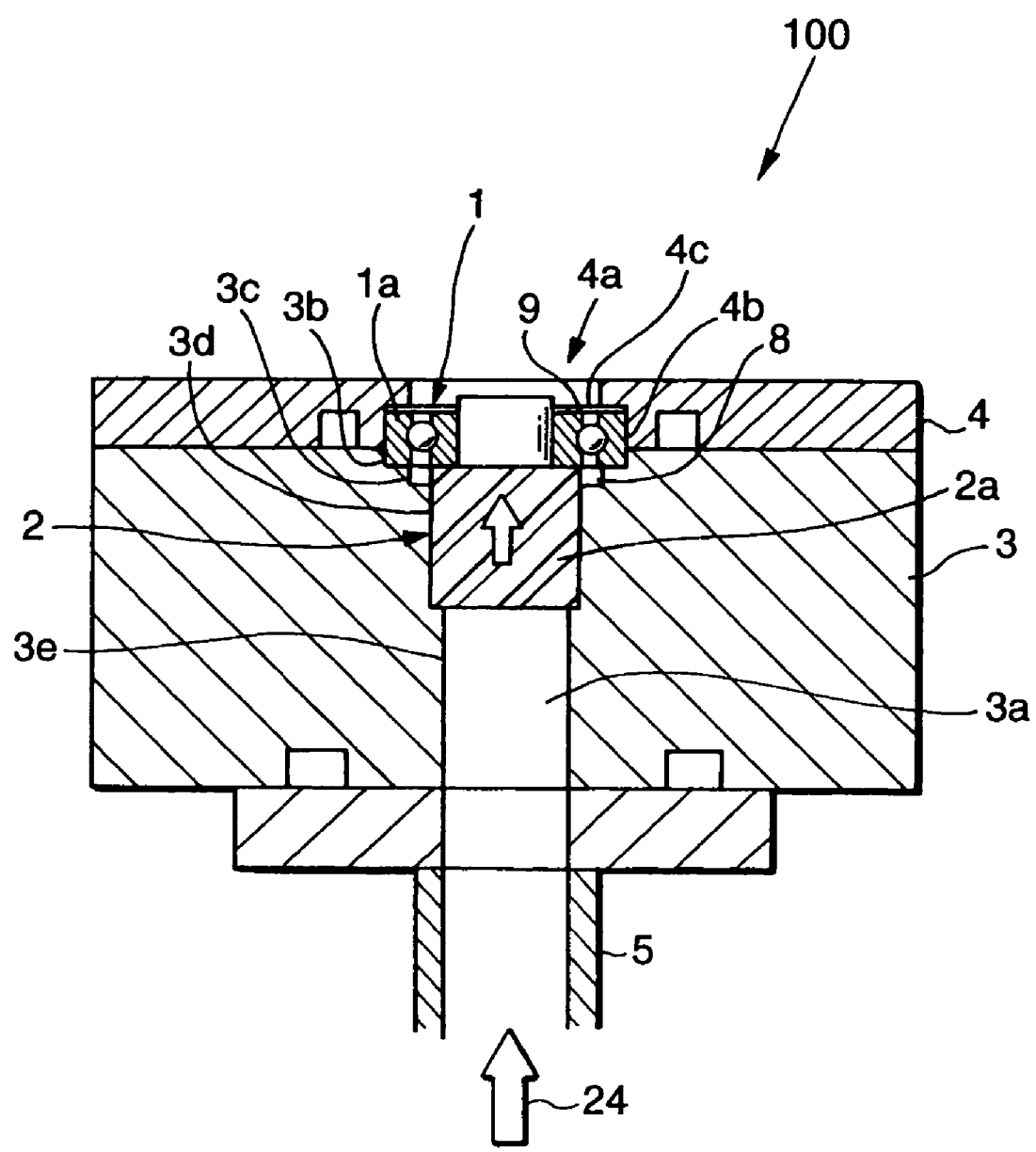
FIG. 2 is a sectional front view of the structure of the ball/roller bearing cleaning apparatus according to the first embodiment.

FIG. 1 is a schematic exploded view of a cleaning apparatus for cleaning a ball/roller bearing according to a first embodiment of the invention, and FIG. 2 is a sectional front view of the ball/roller bearing cleaning apparatus shown in FIG. 1, showing the structure thereof.

As shown in FIGS. 1 and 2, the ball/roller bearing cleaning apparatus 100 according to the first embodiment comprises a cylindrical-shaped rotary die 2, the cylindrical portion of which is to be fitted with an inner ring 1b of a ball/roller bearing to be cleaned (which is hereinafter referred to as a bearing to be cleaned) 1, a holder 3 for storing the bearing to be cleaned 1 and cylindrical-shaped rotary die 2 in its communicating hole 3a serving as a cleaning liquid flow passage, a cover 4 for covering the upper surface of the holder 3, and a pipe 5 which is connected to the communicating hole 3a of the holder 3 and is used to supply cleaning liquid.

In the communicating hole 3a of the holder 3, there are formed four stages of cylindrical grooves which are coaxial with each other but are different in diameter from each other. Of the four stages of cylindrical grooves, the largest cylindrical groove 3b has an inner peripheral diameter which is slightly larger than the outside diameter of the bearing to be cleaned 1, the second-stage cylindrical groove 3c has an inner peripheral diameter which is substantially equal to the inside diameter of the outer ring of the bearing to be cleaned 1, the third-stage cylindrical groove 3d has an inner peripheral diameter which is slightly larger than the outside diameter of the cylindrical-shaped rotary die 2, and the fourth-stage smallest cylindrical groove 3e has an inner peripheral diameter which is smaller than the outside diameter of the cylindrical-shaped rotary die 2.

The largest cylindrical groove 3b is fitted between the bearing to be cleaned 1 and cylindrical-shaped rotary die 2 with a minimum clearance to thereby bring the bearing to be cleaned 1 on-center. The second-stage cylindrical groove 3c forms a void below a location between the outer ring 1a and inner ring 1b of the bearing to be cleaned 1. And, the cylindrical-shaped rotary die 2 is inserted into the third-stage cylindrical groove 3d and is then secured to the fourth-stage smallest cylindrical groove 3e, whereby the cylindrical-shaped rotary die 2 is supported in such a manner that it can be rotated within the third-stage cylindrical groove 3d.

In the central portion of the cover 4, there is formed an opening 4a which penetrates through the upper and lower surfaces of the cover 4 central portion and, in the opening 4a, there are formed two stages of cylindrical grooves which are different in diameter from each other. Of the two stages of cylindrical grooves, the larger cylindrical groove 4b has an inner peripheral diameter which is larger than the outside diameter of the bearing to be cleaned 1. The above-mentioned holder 3 and cover 4 cooperate together in forming raceway fixing unit.

The cylindrical-shaped rotary die 2 includes spirally-shaped grooves (which are hereinafter referred to as spiral grooves) 2a respectively formed in the outer peripheral surface thereof. In case where the cylindrical-shaped rotary die 2 is held in the third-stage cylindrical groove 3d of the holder 3 and the cleaning liquid is supplied into the hole (cleaning liquid supply passage) 3a, the cleaning liquid flows between the spiral grooves 2a and cylindrical groove 3d, so that the cylindrical-shaped rotary die 2 rotates.

In this case, since the spiral grooves 2a, as shown in FIGS. 1 and 2, are formed so as to extend counterclockwise from the lower side to the upper side of the cylindrical-shaped rotary die 2, as the cleaning liquid flows within the spiral grooves 2a, the cylindrical-shaped rotary die 2 is rotated clockwise when it is viewed from above the holder 3.

At the same time, because the cylindrical-shaped rotary die 2 receives a force which moves it upward, the cylindrical-shaped rotary die 2 and bearing to be cleaned 1 are floated integrally with each other in a direction to fill in a clearance 9 between the bearing to be cleaned 1 and cover 4. As a result of this, the end face of the outer ring of the bearing to be cleaned 1 is pressed against the plane surface 4c of the cover 4 and, due to a frictional force between them, the outer ring is fixed.

In the thus structured ball/roller bearing cleaning apparatus 100, in case the cleaning liquid is supplied through the pipe 5 into the hole 3a of the holder 3, the cleaning liquid passes through the spiral grooves 2a formed in the cylindrical-shaped rotary die 2 as well as through a clearance existing between the cylindrical-shaped rotary die 2 and holder 3, further it passes through between the outer ring 1a and inner ring 1b of the bearing to be cleaned 1, and it finally goes out upward. In this case, due to a pumping action generated by the flow of the cleaning liquid and spiral grooves 2a, the cleaning liquid passing through the outer ring 1a and inner ring 1b of the bearing to be cleaned 1 is increased in pressure over the time when it is supplied, so that the cleaning power of the cleaning liquid can be enhanced. Also, because a preload is given in a direction which is shown by an arrow mark in FIG. 2 and in which the cleaning liquid flows, the inner ring 1b, rolling bodies 1c and retainer (not shown) of the bearing to be cleaned 1 are rotated while maintaining a given speed ratio with respect to the cylindrical-shaped rotary die 2, so that the relative rotation speed ratio among the outer ring 1a, inner ring 1b, rolling bodies 1c and retainer becomes constant.

For example, a retainer rotation speed $n_c$ with respect to a ball-and-rolling bearing having a contact angle of 0° can be found according to the following equation (1):

$$n_c = (1 - d/d_m) \times n_i / 2 \qquad (1)$$

Also, in this case, the speed $n_a$ of rotation of the rolling body 1c about its own axis can be found according to the following equation (2):

$$n_a = (d_m/d - d/d_m) \times n_i / 2 \qquad (2)$$

In the above equations, $n_i$ expresses an inner ring rotation speed, d expresses the diameter of the rolling bodies, and $d_m$ expresses PCD (the pitch circle diameter of the bearing). Therefore, the inner ring rotation speed $n_i$, retainer rotation speed $n_c$ and rolling body rotation speed $n_a$ about its own axis are different from each other, so that their relative contact positions during rotation are caused to vary.

In a state where the inner ring 1b, rolling bodies 1c and retainer are relatively rotating with respect to each other in this manner, the cleaning liquid is allowed to flow through between the inner ring 1b and outer ring 1a of the bearing to be cleaned 1.

On the other hand, where there are clearances among the outer ring 1a, inner ring 1b and rolling bodies 1c, the outer ring 1a and inner ring 1b are allowed to rotate with respect to each other but there is a possibility that the rolling bodies 1c and retainer are disabled from rotating with respect to one of the outer and inner rings 1a and 1b. That is, in such state, when the inner ring rotates, only the inner ring 1b is allowed to rotate.

In the ball/roller bearing cleaning apparatus 100 according to the present embodiment, while the inner ring 1b, rolling bodies 1c and retainer of the bearing to be cleaned 1 are respectively rotating, the cleaning liquid flows through several paths, which are respectively defined by and between the raceway surface of the outer ring 1a and the raceway surface of the inner ring 1b and surround the rolling bodies and retainer, from the axial direction of the bearing to be cleaned 1. Thanks to this, the cleaning liquid is able to clean well dirt particles (such as, the residuals of ground particles, dust produced by grinding and cutting, and grinding liquid and the dirt particles of the grinding liquid) from the rolling bodies and retainer that are respectively disposed in the interior portion of the bearing to be cleaned.

By the way, the cleaning liquid is made to circulate through a tank and a pipe (both of which are not shown) before it is used to clean the bearing to be cleaned 1 and, therefore, by providing a filter in the pipe, the cleanliness of the cleaning liquid can be maintained.

(Second Embodiment)

Figure 3:
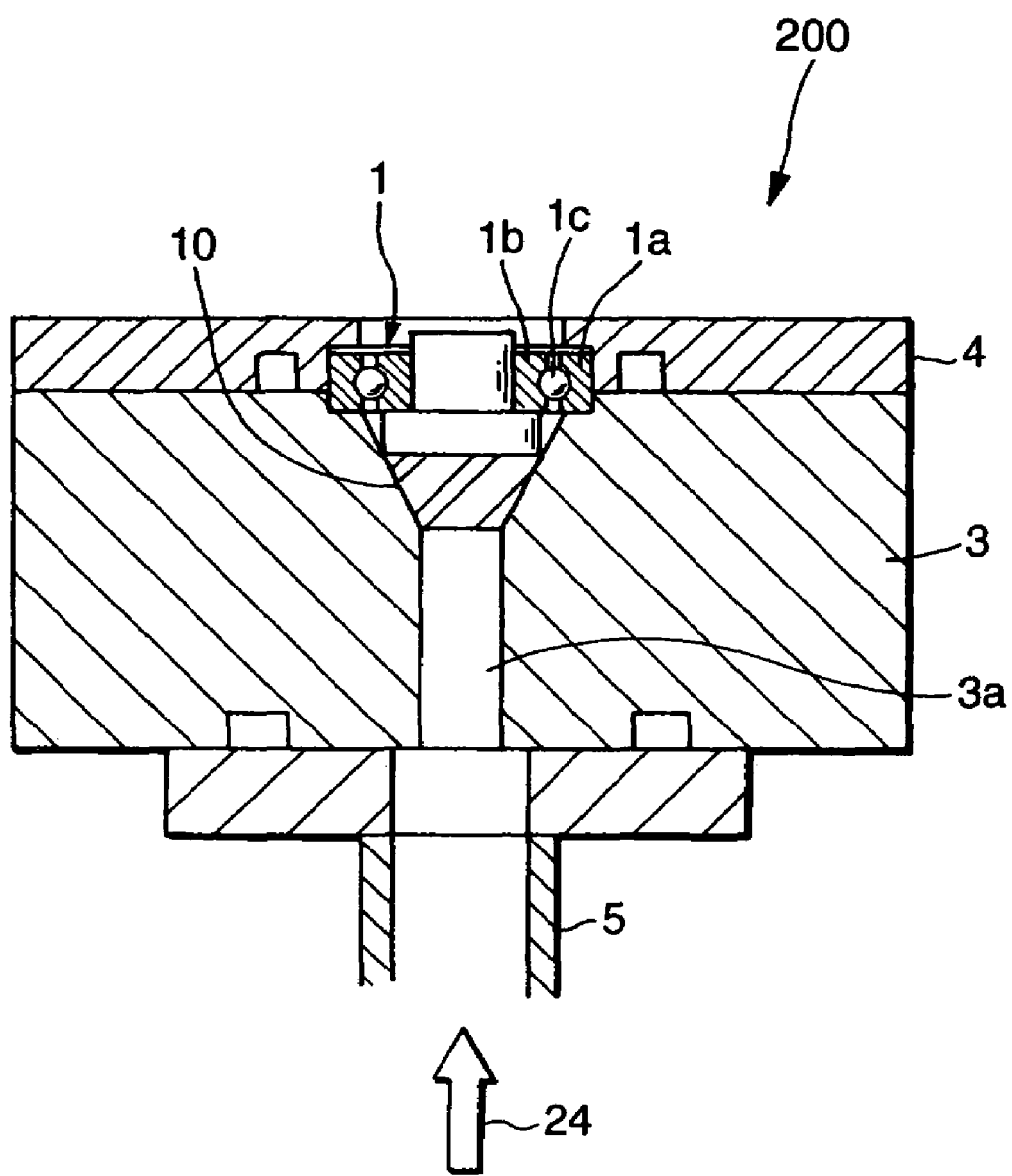
FIG. 3 is a sectional front view of the structure of a ball/roller bearing cleaning apparatus according to a second embodiment of the invention.

Now, FIG. 3 is a sectional front view of a ball/roller bearing cleaning apparatus according to a second embodiment of the invention, showing the structure thereof. By the way, in FIG. 3, parts used here in common with the previously described FIGS. 1 and 2 are given the same designations and thus the description thereof is omitted here.

As shown in FIG. 3, in a ball/roller bearing cleaning apparatus 200 according to the second embodiment, there is used a conical-shaped rotary die 10 including a lower end face with the area thereof reduced, in order to be able to reduce a force which acts on a bearing to be cleaned in the axial direction thereof.

According to this structure, because the diameter of the hole 3a of the holder 3 is reduced, there can be reduced the magnitude of a force applied onto the inner ring 1b of the bearing to be cleaned 1 in the axial direction thereof through the conical-shaped rotary die 10, which can prevent a possibility that the rotation of the inner ring 1b can be interfered by the excessive force in axial-direction.

In the case of the thus structured conical-shaped rotary die 10, similarly to the ball/roller bearing cleaning apparatus 100 according to the previously described first embodiment, while the inner ring 1b, rolling bodies 1c and retainer (not shown) of the bearing to be cleaned 1 are respectively rotating, the cleaning liquid flows through between the outer ring 1a and inner ring 1b. Thanks to this, the rolling bodies 1c and retainer of the bearing to be cleaned 1 can be cleaned well.

(Third Embodiment)

Figure 4:
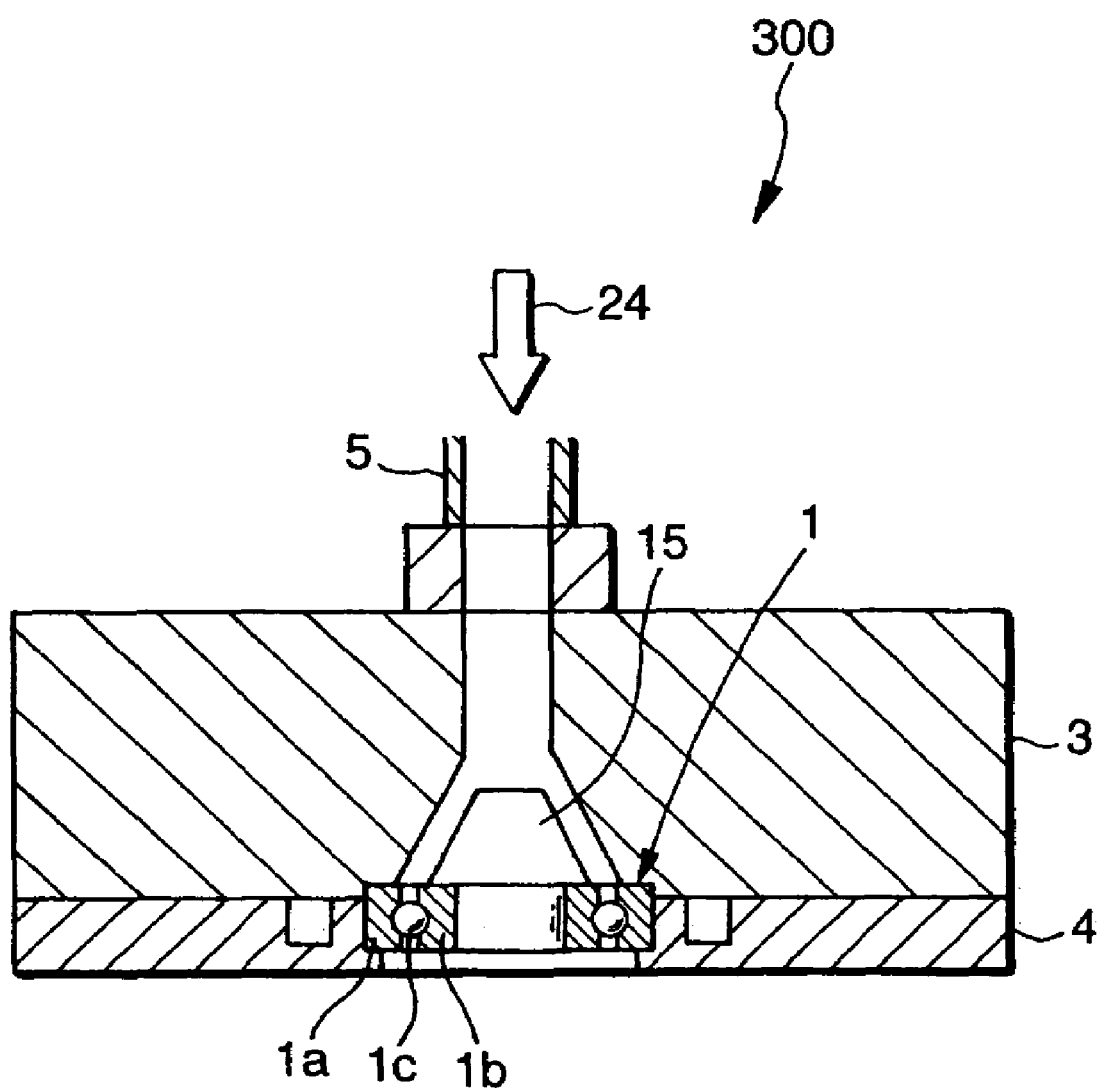
FIG. 4 is a sectional front view of the structure of a ball/roller bearing cleaning apparatus according to a third embodiment of the invention.

Now, FIG. 4 is a sectional front view of a ball/roller bearing cleaning apparatus according to a third embodiment of the invention, showing the structure thereof. In FIG. 4, parts used here in common with the previously described FIGS. 1, 2 and 3 are given the same designations and thus the description thereof is omitted here.

By the way, in the bearing to be cleaned 1, hard dirt particles could exist in the interior portion of the bearing to be cleaned 1. In such case, if the bearing to be cleaned 1 is rotated for cleaning the same, the hard dirt particles could damage the bearing itself (in particular, the raceway surfaces of the raceways thereof and the rolling surfaces of the rolling bodies thereof).

Now, the ball/roller bearing cleaning apparatus 300 according to the present embodiment is especially effective when hard dirt particles exist in the interior portion of the bearing to be cleaned 1.

That is, as shown in FIG. 4, the ball/roller bearing cleaning apparatus 300 includes a conical-shaped die 15 having a conical surface which can be fitted with one end side of the inner ring 1b of the bearing to be cleaned 1 and can cooperate with the communicating hole 3a of the holder 3 in forming a flow passage for the cleaning liquid. Due to use of the conical-shaped die 15, the cleaning liquid having high pressure can be forcibly made to flow through the bearing to be cleaned 1 without applying a rotational drive force to the bearing to be cleaned 1.

This prevents the bearing to be cleaned 1 from rotating in the cleaning operation and thus, even in case where hard dirt particles exist in the interior portion of the bearing to be cleaned 1, the bearing to be cleaned 1 can be prevented from damages.

Also, even in case where, after the bearing to be cleaned 1 is cleaned without rotating it, the bearing to be cleaned 1 is cleaned while rotating it, by replacing the conical-shaped die to the present embodiment with a conical-shaped rotary die including spiral grooves, a rotation-type cleaning operation can be carried out similarly with the second embodiment. That is, the non-rotation-type cleaning step can be changed into the rotation-type cleaning step easily.

(Fourth Embodiment)

Figure 5:
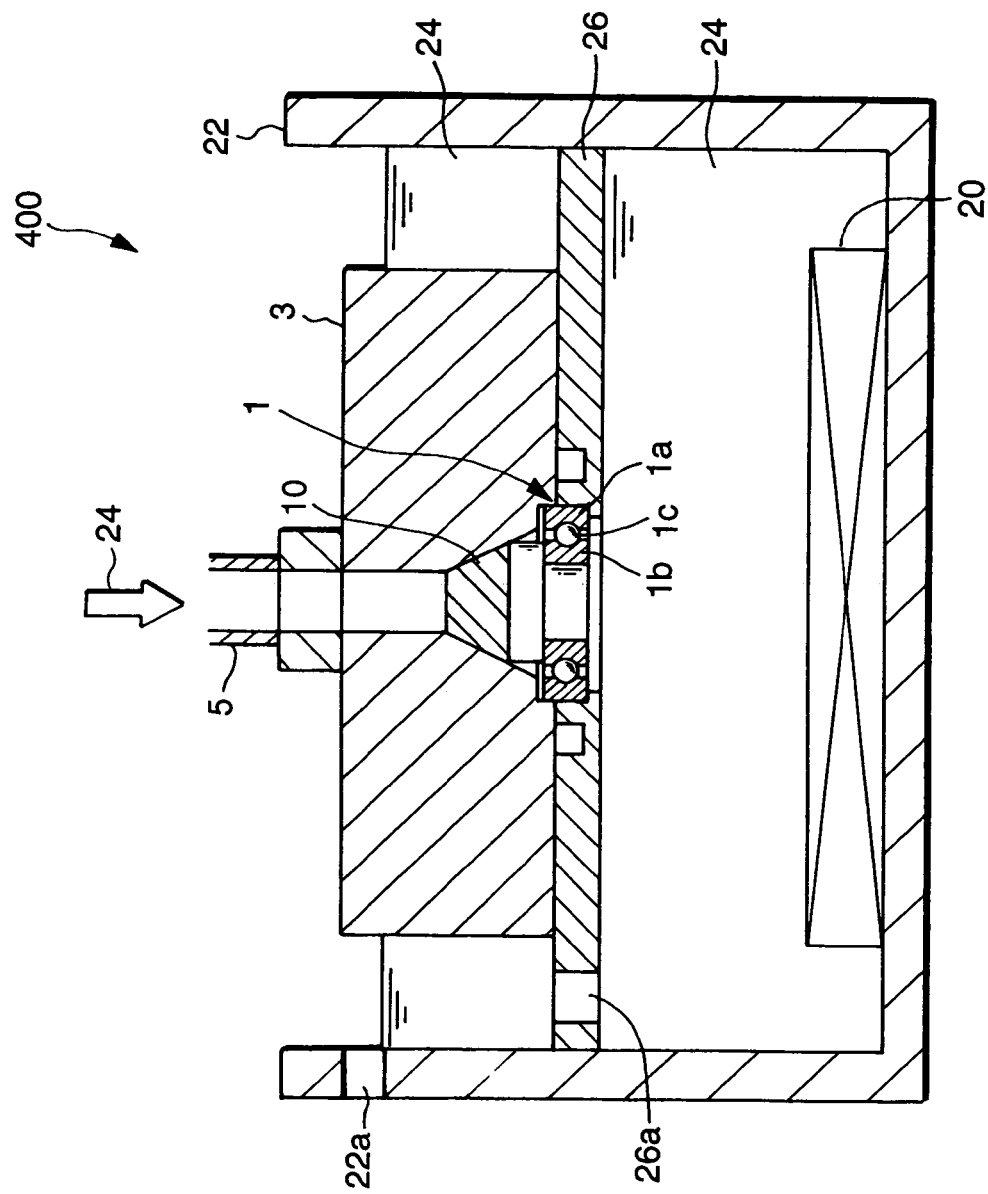
FIG. 5 is a sectional front view of the structure of a ball/roller bearing cleaning apparatus according to a fourth embodiment of the invention.

Now, FIG. 5 is a sectional front view of a ball/roller bearing cleaning apparatus according to the fourth embodiment of the invention, showing the structure thereof. In FIG. 5, parts used here in common with the previously described FIGS. 1, 2, 3 and 4 are given the same designations and thus the description thereof is not shown here.

As described above, the ball/roller bearing cleaning apparatus 100, 200 and 300 respectively according to the first to third embodiments of the invention each has a structure that the cleaning liquid is forcibly flowed through between the outer ring 1a and inner ring 1b of the bearing to be cleaned 1. On the other hand, the ball/roller bearing cleaning apparatus 400 according to the present embodiment has a structure that, as shown in FIG. 5, for example, the ball/roller bearing cleaning apparatus 200 according to the second embodiment is disposed upside down in a cleaning vessel 22 with an ultrasonically vibrating plate (ultrasonically vibrating unit) 20 and the cleaning apparatus 400 is filled with cleaning liquid 24. Specifically, in the cleaning vessel 22, at a position thereof spaced a given distance from the ultrasonic vibration plate 20, there is mounted a fixed plate 26 which includes an opening 26a and the central portion of which has the same shape as the cover 4 of the above-mentioned ball/roller bearing cleaning apparatus 200, while the ball/roller bearing cleaning apparatus 200 except for the cover 4 is mounted on the fixed plate 26. Also, in the upper portion of the cleaning vessel 22, there is formed a drain hole 22a for discharging the excess of the cleaning liquid 24.

By the way, the fixed plate 26 is placed at the height where the cleaning effect by the ultrasonic wave is largest.

According to the present structure, by supplying the cleaning liquid, the inner ring 1b, rolling bodies 1c and retainer (not shown) of the bearing to be cleaned 1 are rotated and, in addition, ultrasonic waves are radiated from the bottom portion of the cleaning vessel 22, so that the surface of each rolling body 1c rotating about its own axis can be ultrasonically cleaned, which can further enhance the cleaning effect of the rolling body 1c. Also, similarly to the ball/roller bearing cleaning apparatus according to the first and second embodiments, since the cleaning liquid flows through between the outer ring 1a and inner ring 1b, the present ball/roller bearing cleaning apparatus 400 is also excellent in removing the dirt particles and, especially, the rolling bodies 1c and retainer of the bearing to be cleaned 1 can be cleaned well.

And, in the ball/roller bearing cleaning apparatus 400 according to the present embodiment, since the bearing to be cleaned 1 that has been cleaned once is turned upside-down and it is then cleaned again, the cleaning effect by the ultrasonic waves can be given to the rolling bodies 1c and retainer evenly, thereby being able to enhance the cleaning effect further.

By the way, in the present embodiment, there is used a conical-shaped rotary die 10. However, this is not limited to the conical shaped rotary die, but, of course, use of the cylindrical-shaped rotary die 2 according to the first embodiment can also provide a similarly effect.

(Fifth Embodiment)

Figure 6:
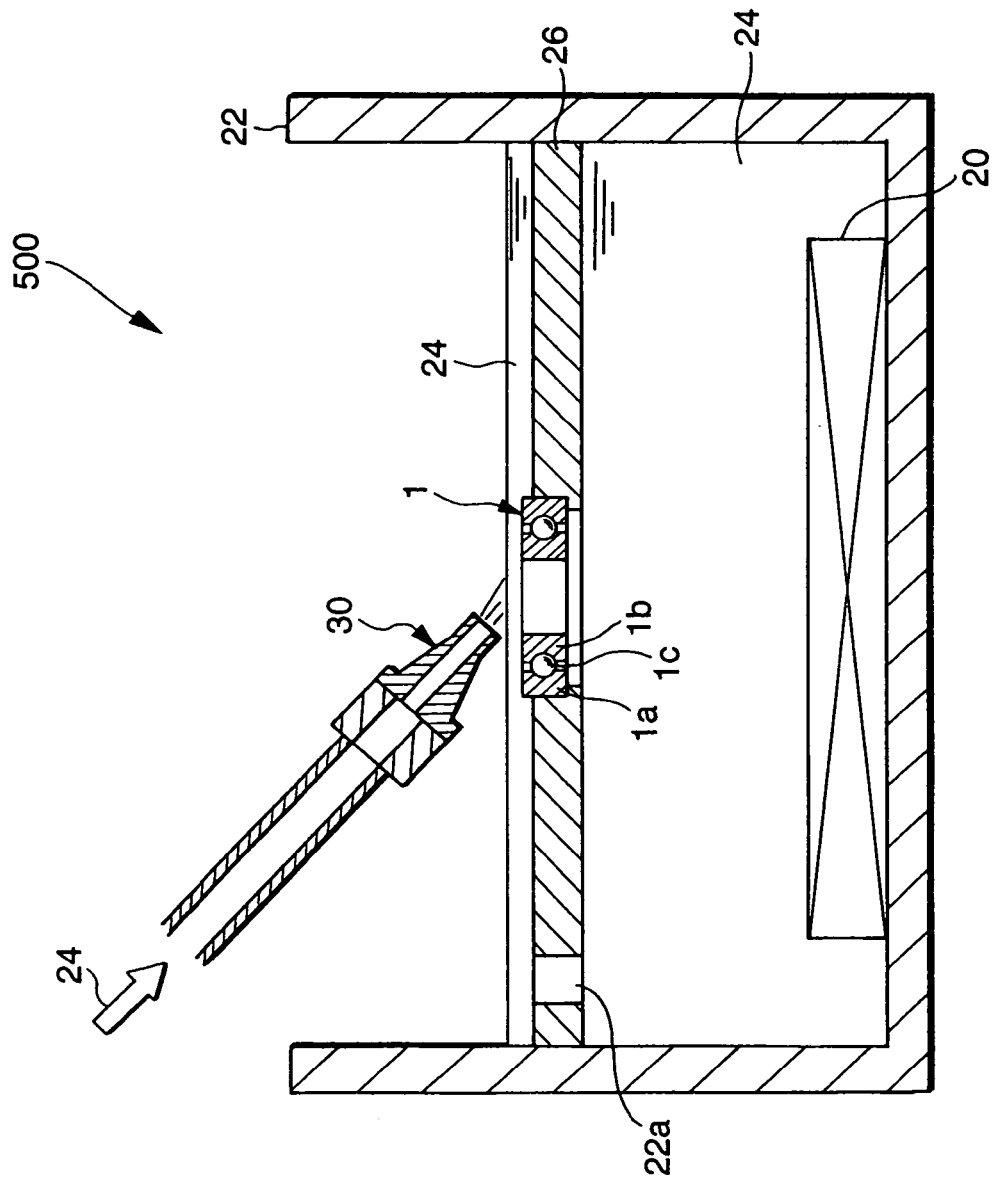
FIG. 6 is a sectional front view of the structure of a ball/roller bearing cleaning apparatus according to a fifth embodiment of the invention.

Now, FIG. 6 is a sectional front view of a ball/roller bearing cleaning apparatus according to the fifth embodiment of the invention, showing the structure thereof. In FIG. 6, parts used here in common with the previously described FIGS. 1, 2, 3, 4 and 5 are given the same designations and thus the description thereof is not shown here.

The ball/roller bearing cleaning apparatus 500 according to the present embodiment uses a cleaning nozzle (cleaning liquid injection unit) for jetting the cleaning liquid, instead of the holder 3 used in the ball/roller bearing cleaning apparatus 400 according to the fourth embodiment.

In the previously described ball/roller bearing cleaning apparatus 400 according to the fourth embodiment, the inner ring 1b, rolling bodies 1c and retainer (not shown) of the bearing to be cleaned 1 are rotated by the cleaning liquid, whereby the cleaning liquid is forcibly flowed into the interior portion of the bearing to be cleaned 1; however, depending on the structure of the ball/roller cleaning apparatus, there is a case in which the cleaning liquid cannot be forcibly made to flow into the interior portion of the bearing to be cleaned 1. In this case, as illustrated in FIG. 6 which shows the present embodiment of the invention, there may be employed a structure in which, with the outer ring 1a of the bearing to be cleaned 1 fixed, the cleaning liquid is jetted out with high pressure from a cleaning nozzle 30 aiming at the rolling bodies 1c of the bearing to be cleaned 1 from obliquely above of the bearing to be cleaned 1 in the circumferential direction thereof. Thus, the rolling bodies 1c, retainer and inner ring 1b of the bearing to be cleaned 1 can be cleaned while they are being rotated. By the way, in order that the rotation of the bearing to be cleaned 1 by the high pressure injection of the cleaning liquid can be attained positively, preferably, the bearing to be cleaned 1 may be positioned at a position which corresponds to the surface layer portion of the cleaning liquid.

(Sixth Embodiment)

Figure 7:
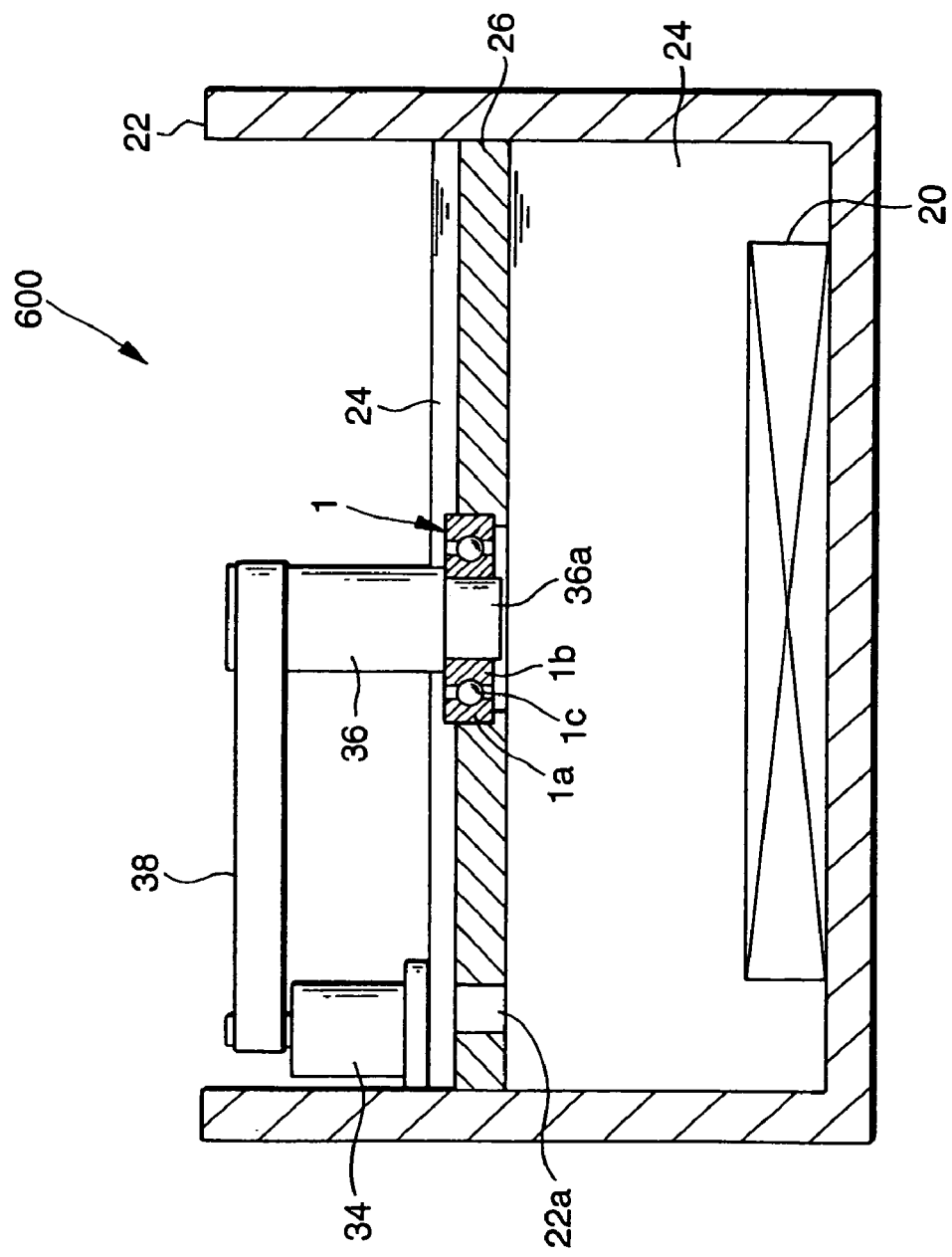
FIG. 7 is a sectional front view of the structure of a ball/roller bearing cleaning apparatus according to a sixth embodiment of the invention.

Now, FIG. 7 is a sectional front view of a ball/roller bearing cleaning apparatus according to a sixth embodiment of the invention, showing the structure thereof. In FIG. 7, parts used here in common with the previously described FIGS. 1, 2, 3, 4, 5 and 6 are given the same designations and thus the description thereof is omitted here.

The ball/roller bearing cleaning apparatus 600 according to the present embodiment, similarly to the ball/roller bearing cleaning apparatus 400 and 500 according to the fourth and fifth embodiment, cleans the bearing to be cleaned 1 with ultrasonic wave while rotating the same but, unlike them, the cleaning apparatus 600 includes a motor serving as a rotation drive source for rotating the bearing to be cleaned 1. That is, the ball/roller bearing cleaning apparatus 600 comprises a motor 34 being fixed to the upper portion of a cleaning vessel 22, a rotary shaft 36 having a leading end 36a fitted with the inner ring 1b of the bearing to be cleaned 1, and bearing to be cleaned drive unit consisting of a belt 38 which is used to connect together the motor 34 and rotary shaft 36 for power transmission between them.

By the way, it is also possible to employ a structure in which, instead of use of the motor 34, the rotary shaft 36 is provided with blades and is rotated by an air turbine. Also, there may be used a system in which the ultrasonically vibrating plate 20 is not used but the cleaning liquid is forcibly flowed due to rotation of the inner ring 1b of the bearing to be cleaned 1.

With use of the structure according to the present embodiment, since the inner ring 1b of the bearing to be cleaned 1 is forcibly driven or rotated, the cleaning liquid can be made to circulate more strongly in the interior portion of the bearing to be cleaned 1. That is, according to the present embodiment, when compared with the structure in which the bearing to be cleaned 1 is rotationally driven by unit of the flow of the cleaning liquid, the bearing to be cleaned 1 can be rotationally driven at higher speeds, thereby being able to enhance the cleaning effect.

(Seventh Embodiment)

Figure 8:
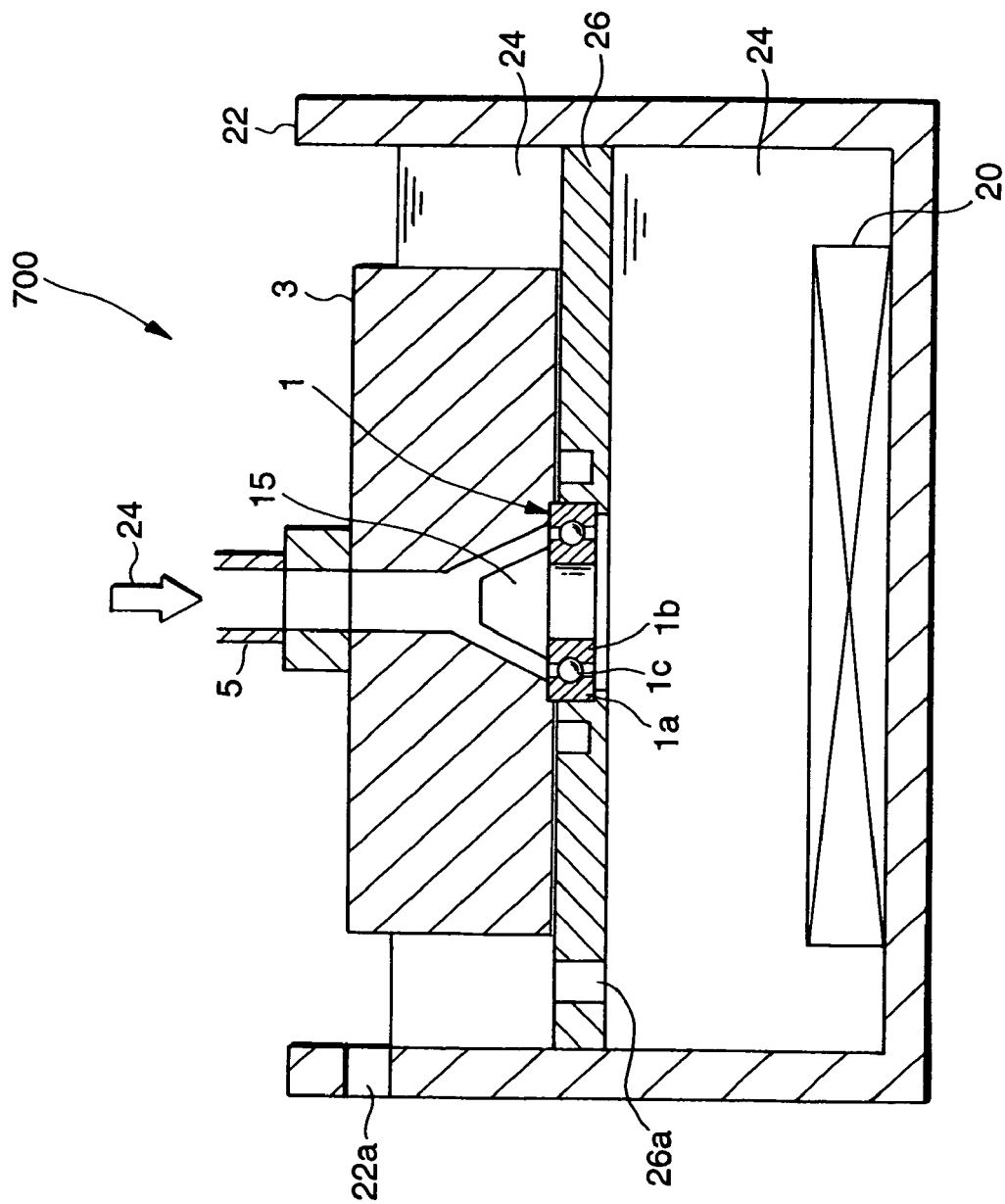
FIG. 8 is a sectional front view of the structure of a ball/roller bearing cleaning apparatus according to a seventh embodiment of the invention.

Now, FIG. 8 is a sectional front view of a ball/roller bearing cleaning apparatus according to the seventh embodiment of the invention, showing the structure thereof. In FIG.

8, parts used here in common with the previously described FIGS. 1, 2, 3, 4, 5, 6 and 7 are given the same designations and thus the description thereof is not shown here.

The ball/roller bearing cleaning apparatus 700 according to the present embodiment provides a cleaning system which, similarly to the previously described third embodiment, is effective especially when a large number of hard dirt particles are present in the interior portion of the bearing to be cleaned 1.

That is, as shown in FIG. 8, the present ball/roller bearing cleaning apparatus 700 is structured such that the ball/roller bearing cleaning apparatus 300 according to the third embodiment is stored within a cleaning vessel 22 and, in the bottom portion of the cleaning vessel 22, there is disposed an ultrasonic vibration plate 20. According to this structure, without rotating the bearing to be cleaned 1 by a conical-shaped die 15, the cleaning liquid of high pressure is forcibly made to flow through the bearing to be cleaned 1 and, in addition, ultrasonic waves are radiated from below the bearing to be cleaned 1, whereby the bearing to be cleaned 1 is kept from rotating while it is being cleaned. This makes it possible to prevent the bearing to be cleaned 1 from damage when hard dirt particles are present in the interior portion of the bearing to be cleaned 1, thereby properly cleaning the bearing to be cleaned 1.

Also, by replacing the conical-shaped die 15 with a conical-shaped rotary die having spiral grooves, the present cleaning system can be easily changed to a cleaning system in which the bearing to be cleaned 1 is cleaned while rotating the same.

(Eighth Embodiment)

Figure 9:
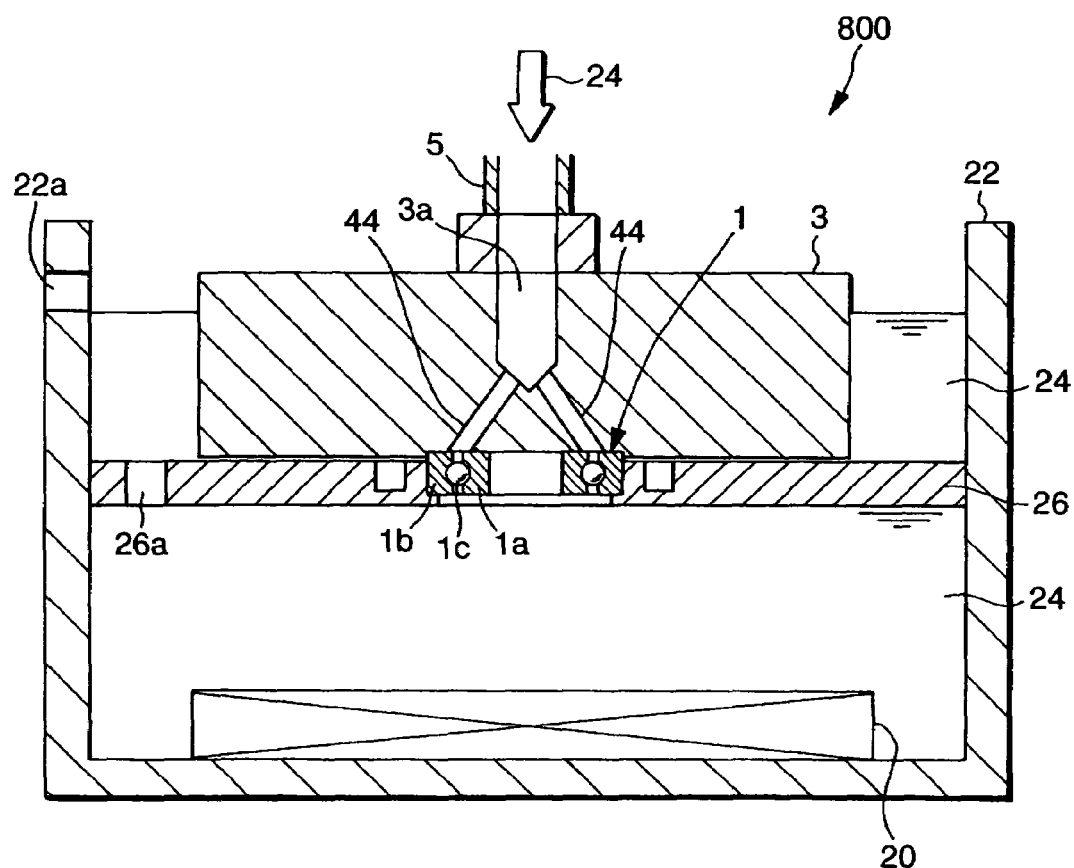
FIG. 9 is a sectional front view of the structure of a ball/roller bearing cleaning apparatus according to an eighth embodiment of the invention.

Now, FIG. 9 is a sectional front view of a ball/roller bearing cleaning apparatus according to the eighth embodiment of the invention, showing the structure thereof. In FIG. 9, parts used here in common with the previously described FIGS. 1, 2, 3, 4, 5, 6, 7 and 8 are given the same designations and thus the description thereof is not shown here.

Figure 10:
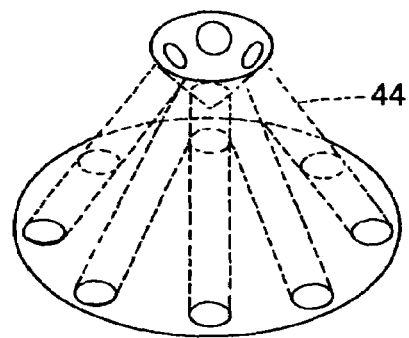
FIG. 10 is a conceptual view of arrangement of nozzle holes formed in the ball/roller bearing cleaning apparatus shown in FIG. 9.

The ball/roller bearing cleaning apparatus 800 according to the present embodiment provides a cleaning system which, similarly to the ball/roller bearing cleaning apparatus 700 according to the seventh embodiment, without rotating the bearing to be cleaned 1, the cleaning liquid is forcibly made to flow through the bearing to be cleaned 1 and, in addition, ultrasonic waves are radiated from below the bearing to be cleaned 1. In the present embodiment, however, instead of the conical-shaped die 15, there are formed in the holder 3 a total of eight nozzle holes 44 which are used to allow the cleaning liquid to flow through the bearing to be cleaned 1. These eight nozzle holes 44, as conceptually shown in FIG. 10, are arranged in such a manner that they are spaced almost at regular intervals from each other in the circumferential direction of the holder 3 and also they spread outwardly in the radial direction of the holder; that is, preferably, the eight nozzle holes 44 may be arranged in such a manner that interference with the nozzle holes 44 by the ultrasonic waves can provide the greatest cleaning power. By the way, the number of nozzle holes 44 is not limited to eight but, according to the cleaning power required, there may be set a proper number of nozzle holes 44.

In the present embodiment as well, since the cleaning liquid is flowed through between the inner ring 1b and outer ring 1a of the bearing to be cleaned 1 without rotating the bearing to be cleaned 1, there is less fear that the raceway surfaces of the inner ring 1b and outer ring 1a of the bearing to be cleaned 1 as well as the surfaces of the rolling bodies 1c of the bearing to be cleaned 1 can be damaged.

(Ninth Embodiment)

Figure 11:
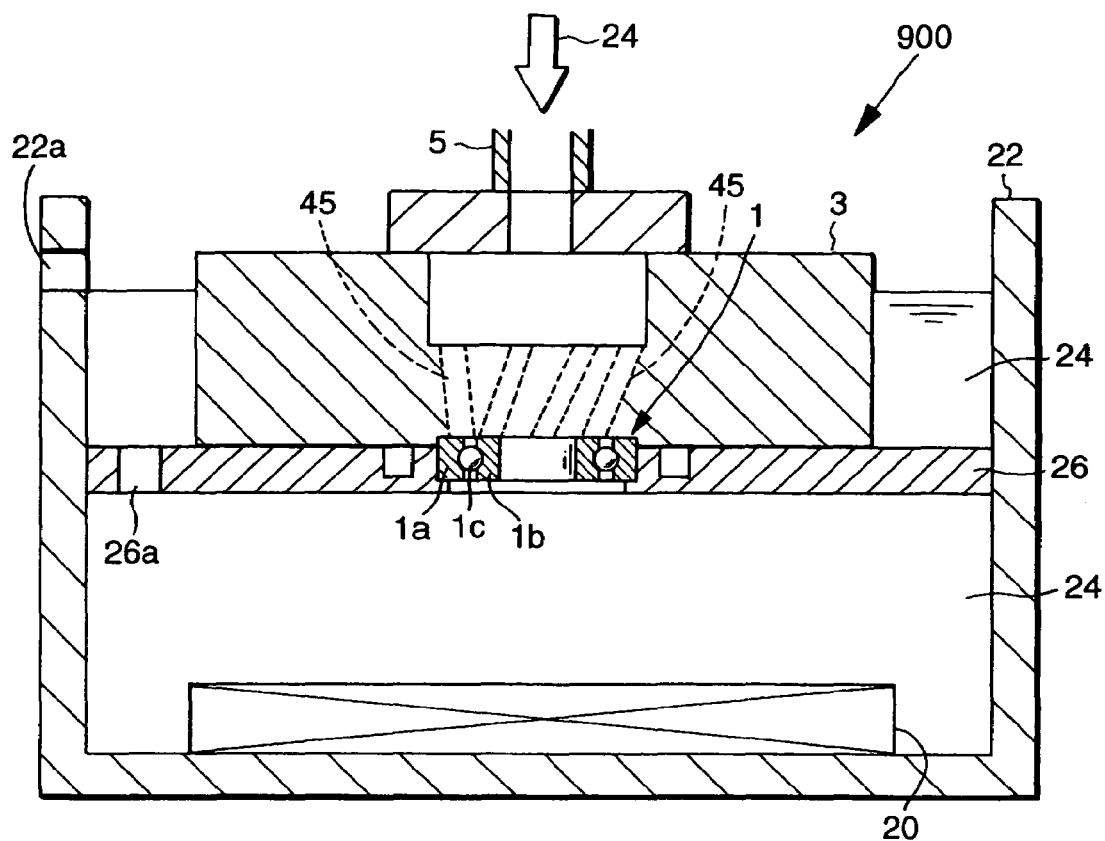
FIG. 11 is a sectional front view of the structure of a ball/roller bearing cleaning apparatus according to a ninth embodiment of the invention.

Now, FIG. 11 is a sectional front view of a ball/roller bearing cleaning apparatus according to the ninth embodiment of the invention, showing the structure thereof. In FIG. 11, parts used here in common with the previously described FIGS. 1, 2, 3, 4, 5, 6, 7, 8, 9 and 10 are given the same designations and thus the description thereof is not shown here.

Figure 12:
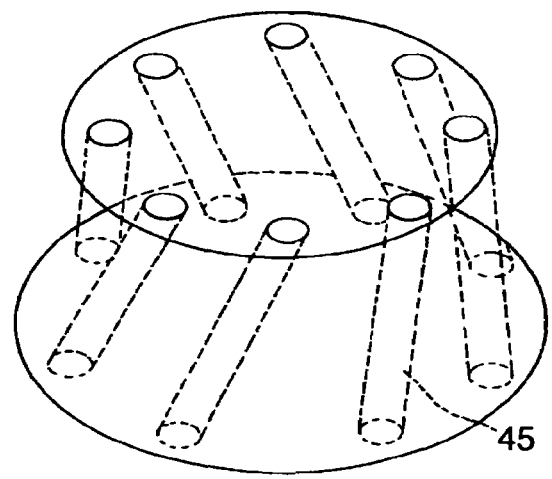
FIG. 12 is a conceptual view of arrangement of nozzle holes formed in the ball/roller bearing cleaning apparatus shown in FIG. 11.

The ball/roller bearing cleaning apparatus 900 according to the present embodiment provides a cleaning system which, similarly to the ball/roller bearing cleaning apparatus 800 according to the eighth embodiment, there are formed in the holder 3 a total of eight nozzle holes 45 which are used to allow the cleaning liquid to flow through the bearing to be cleaned 1; but, the apparatus 900 is different from the apparatus 800 in that these nozzle holes 45 are inclined in the circumferential direction of the holder 3. In the present embodiment as well, the number of nozzle holes 45 is not limited to eight but, according to the amount of the cleaning liquid required and the number of rotations of the bearing to be cleaned 1, there may be set a proper number of nozzle holes 45. These eight nozzle holes 45, as conceptually shown in FIG. 12, are arranged in such a manner that they are spaced almost at regular intervals from each other in the circumferential direction of the holder 3 and also the cleaning liquid entering sides and leaving sides of the nozzle holes 45 are set at the radial-direction outward positions of the holder 3 while the entering and leaving sides are rotated with respect to each other in the circumferential direction of the holder 3. Therefore, the cleaning liquid is supplied obliquely from the holder 3 in the circumferential direction thereof on the cleaning liquid leaving sides of the nozzle holes 45 which provide the side of the bearing to be cleaned 1, thereby being able to rotate the bearing to be cleaned 1. At the then time, by setting the angles of the nozzle holes 45 properly, a desired number of rotations of the bearing to be cleaned 1 can be obtained. By the way, the nozzle holes 45, preferably, may be arranged at such positions that allow the ultrasonic waves to provide the highest cleaning effect.

As described above, because the nozzle holes 45 are formed in an inclined manner, the bearing to be cleaned 1 can be rotated and the cleaning liquid can be forcibly made to flow through the bearing to be cleaned 1. Further, in the present embodiment as well, since the ultrasonic waves are radiated from below the bearing to be cleaned 1 to thereby clean the bearing to be cleaned 1, there can be obtained a synergetic cleaning effect. By the way, it is also possible to employ a structure in which the ultrasonic cleaning system is omitted.

(Tenth Embodiment)

Figure 13:
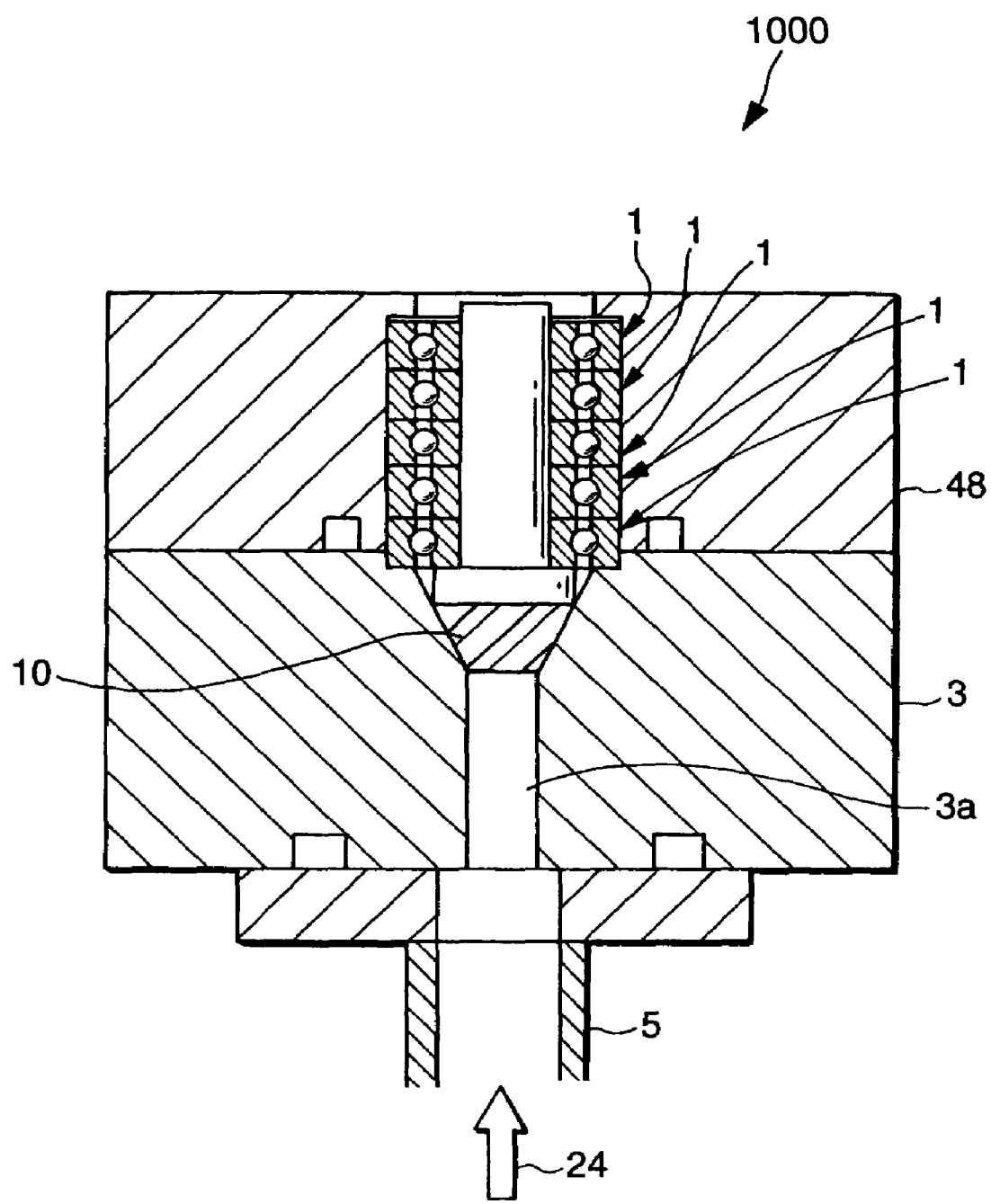
FIG. 13 is a sectional front view of the structure of a ball/roller bearing cleaning apparatus according to a tenth embodiment of the invention.
Figure 14:
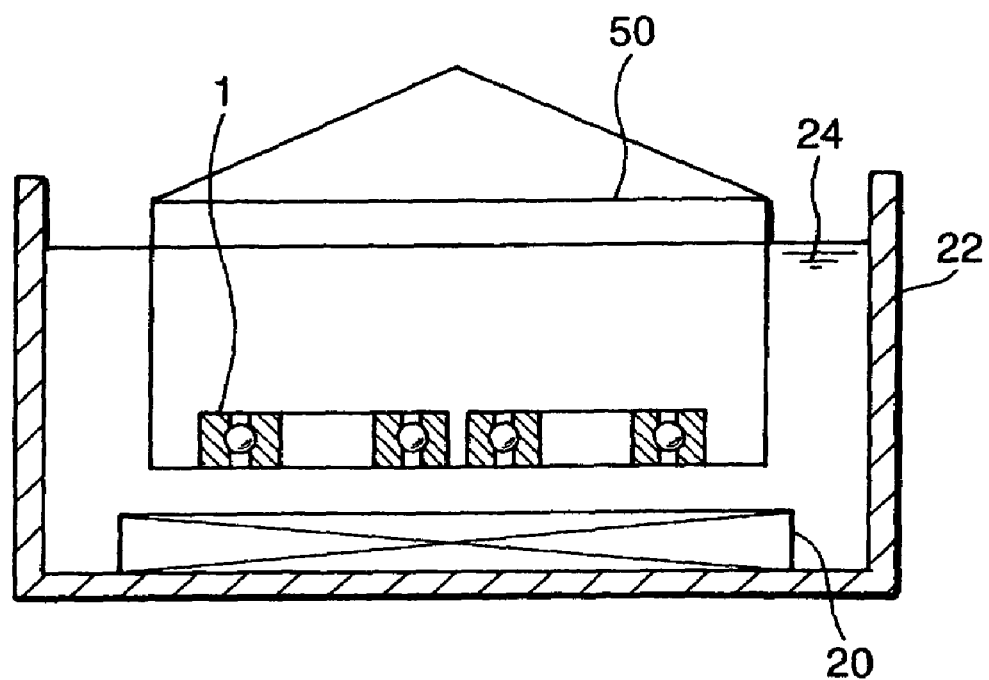
FIG. 14 is a sectional front view of the structure of a conventional ball/roller bearing cleaning apparatus.

Now, FIG. 13 is a sectional front view of a ball/roller bearing cleaning apparatus according to the tenth embodiment of the invention, showing the structure thereof. In FIG. 13, parts used here in common with the previously described FIGS. 1, 2, 3, 4, 5, 6, 7, 8, 9, 10, 11 and 12 are given the same designations and thus the description thereof is omitted here.

In the ball/roller bearing cleaning apparatus respectively according to the first to ninth embodiments, the bearings to be cleaned 1 are cleaned one by one. On the other hand, in the ball/roller bearing cleaning apparatus 1000 according to the present embodiment, for example, using the ball/roller bearing cleaning apparatus 200 according to the second embodiment, plural bearings to be cleaned 1 can be cleaned at the same time.

That is, instead of the cover 4 used in the ball/roller bearing cleaning apparatus 200, there is used a cover 48 having an opening inner surface which is capable of holding the plural bearings to be cleaned 1. Thanks to this structure, while the plural bearings to be cleaned 1 are being rotated while they are piled up on top of each other, the cleaning liquid is flowed through the bearings to be cleaned 1 to thereby be able not only to clean them highly efficiently but also to complete the cleaning operation of numbers of bearings to be cleaned 1 in a short time.

By the way, in any one of the ball/roller bearing cleaning apparatus according to the first to fifth embodiments as well as according to eighth and ninth embodiments, with the outer ring 1*a* of the bearing to be cleaned 1 fixed, the inner ring 1*b* thereof is rotated. However, alternatively, with the inner ring 1*b* fixed, the outer ring 1*a* may be rotated.

As has been described heretofore, according to the ball/roller bearing cleaning apparatus of the invention, by making the cleaning liquid flow through a bearing to be cleaned, which is composed of an inner ring, an outer ring, rolling bodies and a retainer, from the axial direction of the present bearing into spaces existing between the inner ring raceway surface and the outer ring raceway surface of the bearing to be cleaned and surrounding the rolling bodies and retainer, the cleaning liquid is forcibly flowed through between the inner ring raceway surface and the outer ring raceway surface, thereby being able to properly remove dirt particles existing in the interior portion of the bearing. This makes it possible to obtain a high cleaning effect even on the dirt particles that have been conventionally difficult to clean, for example, dirt particles existing in the shadow portion of the cleaning liquid and dirt particles caught by and between the component parts of the bearing.

The invention claimed is:

1. A rolling bearing cleaning method for cleaning a bearing by using a cleaning liquid, the rolling bearing including an inner ring, an outer ring, rolling elements and a retainer, comprising steps of:

immersing the rolling bearing in the cleaning liquid, which is disposed in a cleaning vessel;

fixing one of the outer ring and the inner ring, and disposing the other ring so as to be free to rotate while disposing the rolling bearing to be cleaned near a surface of the cleaning liquid;

flowing the cleaning liquid such that cleaning liquid flows through the rolling bearing from the axial direction of the rolling bearing into spaces existing between raceway surfaces of the inner and outer rings and surrounding the rolling elements and the retainer;

cleaning the rolling bearing by flowing the cleaning liquid through an inner portion of the rolling bearing without rotating the same; and cleaning the rolling bearing by flowing the cleaning liquid through an inner portion of the rolling bearing while rotating the same, via the cleaning fluid, after execution of the non-rotation cleaning step.

2. A rolling bearing cleaning method as set forth in claim 1, further comprising a step of:

cleaning the rolling bearing in combination with an ultrasonic cleaning.

3. A rolling bearing cleaning method as set forth in claim 1, wherein the flowing of the cleaning liquid is performed by jetting with high pressure.

4. A rolling bearing cleaning method as set forth in claim 1, wherein said step of immersing further comprises immersing a plurality of rolling bearings which are superposed on one another.

5. A rolling bearing cleaning method as set forth in claim 3, wherein the jetting with high pressure is performed by causing the cleaning liquid to flow through a channel that narrows in cross sectional area.

\* \* \* \* \*